US006033128A

United States Patent [19]

Krais et al.

[11] Patent Number: 6,033,128

[45] Date of Patent: Mar. 7, 2000

[54] ROLLED FILM BACKING PAPER WITH CINCH TABS

[75] Inventors: Raymond P. Krais; Barry M. Brown, both of Webster, N.Y.; Rickey J. Seyler, Carbon, Ind.

[73] Assignee: Eastman Kodak Company, Rochester, N.Y.

[21] Appl. No.: 09/204,599

[22] Filed: Dec. 3, 1998

[51] Int. Cl.[7] .............................. G03B 17/26; G03C 3/02

[52] U.S. Cl. .......................... 396/415; 396/512; 352/235; 242/348.4; 430/501

[58] Field of Search ..................................... 396/415, 440, 396/512, 514, 513; 352/235, 241; 226/91, 92; 242/582, 348, 348.4, 332.4; 430/501, 496

[56] References Cited

U.S. PATENT DOCUMENTS

| | | | |
|---|---|---|---|
| 1,441,146 | 1/1923 | Eastman . | |
| 3,647,465 | 3/1972 | Shamay | 430/501 |
| 4,303,325 | 12/1981 | Seely | 396/512 |
| 5,255,040 | 10/1993 | Pagano | 396/512 |
| 5,934,592 | 8/1999 | Makino | 242/348.4 |

FOREIGN PATENT DOCUMENTS 763768 3/1997 European Pat. Off. .

*Primary Examiner*—Alan A. Mathews
*Attorney, Agent, or Firm*—Carl F. Ruoff

[57] ABSTRACT

The present invention is a photographic roll film which includes a photographic film strip and a light shielding paper secured to the photographic film strip. The backing paper has a leader which includes at least one cinch tab extending out of a plane of the light shielding paper. The present invention is a photographic roll film which includes a photographic film strip and a light shielding paper secured to the photographic film strip. The backing paper has a leader which includes a front edge, and two side edges. At least one cinch tab extends out of a plane of the backing paper, the cinch tab formed by the front edge, a side edge and a cut forming a cut angle of greater than 90° with a long axis of the leader. The present invention is a photographic roll film which includes a photographic film strip and a light shielding paper secured to the photographic film strip. The backing paper has a leader having a front edge. At least one cinch tab extends out of a plane of the light shielding paper and is formed by a perforation and a fold line, the fold line closer to the front edge of the leader than the perforation.

9 Claims, 2 Drawing Sheets

ROLLED FILM BACKING PAPER WITH CINCH TABS

FIELD OF THE INVENTION

The present invention relates to backing paper used in roll films. More particularly, the present invention provides a leader which works in all types of spools and eliminates slippage between the leader and the spool.

BACKGROUND OF THE INVENTION

Professional cameras are loaded with rolled sensitized film by placing a fresh roll of spooled film in the camera unwind section and pulling the backing paper across the exposure area and inserting the backing paper leader in the slot of the take-up spool and initiating wind-up. It has been estimated that 80% of the professional photographers automatically place their thumb on the take-up spool while partially advancing the spool to eliminate any problem with the leader not remaining in the spool slot (cinching). Though widely practiced, this is considered an unacceptable accommodation on the part of the customer. The remaining 20% of professional photographers do not attempt to accommodate this shortcoming of the backing paper leader and simply insert the leader in the slot and begin to wind. The result is that frequently the leader pulls free of the take-up spool (does not cinch) and the operation must be repeated until successful. This frequency of first time loading failures is unacceptable product performance that requires modifications be found to eliminate the need for either photographer accommodation or repeated attempts to successfully load a roll of professional film.

EP 0 763 768 A2 addresses the cinching problem by punching a hole in the polymer coated backing paper leader tab and modifying the take-up spool design to include a cinch post or pin which protrudes perpendicularly into the spool slot. This cinch post extends through the hole in the polymer coated backing paper leader when properly inserted to grip the backing paper leader as wind-up is initiated. This approach, though successful, suffers from two limitations in that it requires an expensive retooling to manufacture replacement take-up spools with the cinch post and the leader is difficult to remove for recycling after exposure of the film.

U.S. Pat. No. 1,441,146 addressed the cinching problem by utilizing a single-layer backing paper with sufficient stiffness to resist unfolding in the take-up spool slot and releasing during initiation of wind-up. However, the use of polymer coated backing paper has many positive attributes not easily obtainable with paper alone including reduced dirt from finishing operations, reduced self-abrasion, and fewer pinholes for better light protection. Therefore, although the single-layer backing paper structure addresses the cinching problem, it lacks the additional desired roll film backing paper characteristics of polymer coated backing paper.

SUMMARY OF THE INVENTION

The present invention is a photographic roll film which includes a photographic film strip and a light shielding paper secured to the photographic film strip. The backing paper has a leader which includes at least one cinch tab extending out of a plane of the light shielding paper.

The present invention is a photographic roll film which includes a photographic film strip and a light shielding paper secured to the photographic film strip. The backing paper has a leader which includes a front edge, and two side edges.

At least one cinch tab extends out of a plane of the backing paper, the cinch tab formed by the front edge, a side edge and a cut forming a cut angle of greater than 90° with a long axis of the leader.

The present invention is a photographic roll film which includes a photographic film strip and a light shielding paper secured to the photographic film strip. The backing paper has a leader having a front edge. At least one cinch tab extends out of a plane of the light shielding paper and is formed by a perforation and a fold line, the fold line closer to the front edge of the leader than the perforation.

For a better understanding of the present invention along with other advantages and modifications thereof, reference made to the following description and appended claims.

DETAILED DESCRIPTION OF THE INVENTION

This invention provides for a novel modification to the leader of polymer coated backing paper to insure proper cinching of the leader during wind-up on the take-up spool of professional cameras. This is accomplished by providing one or more cinch tabs which, upon full insertion of the backing paper leader into the take-up spool slot, open to extend out of the plane of the backing paper to grip a slot edge when winding tension is applied. The cinch tab(s) can be prepared in either of two ways: with edge notches or with partial perforations as part of the paper notching operation.

The present invention is a photographic roll film which includes a photographic film strip and a light shielding paper secured to said photographic film strip. The backing paper has a leader which includes a front edge, and two side edges. At least one cinch tab extends out of a plane of the backing paper, the cinch tab formed by the front edge, a side edge and a cut forming a cut angle of greater than 90° with a long axis of the leader.

Figure 1:
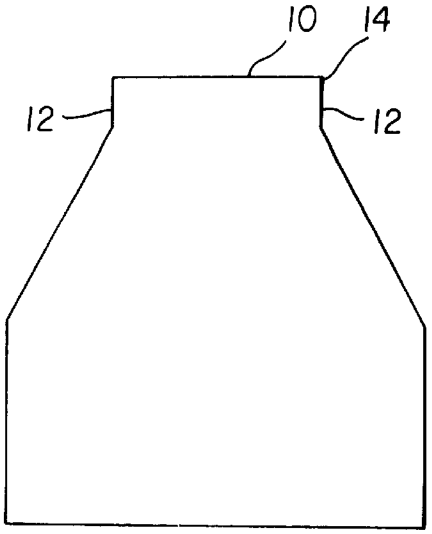
FIG. 1 (prior art)
FIG. 1 is an illustration of a leader of a continuous roll of backing paper.

FIG. 1 is an illustration of the leader of a continuous roll of backing paper as it is currently prepared. The leader has a leading edge 10 and side edges 12 which form a tab 14 which is inserted into the slot of the the takeup spool (not shown). The photographer inserts the tab through the slot and uses his thumb as he winds the takeup spool to secure the leader to the spool. If not done correctly, the leader is not secured and the film does not advance.

Figure 2:
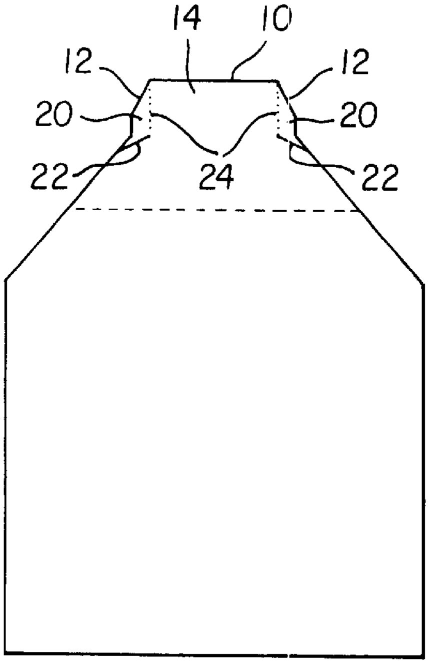
FIG. 2 is an overhead view of the cinch tabs of the present invention.
Figure 4:
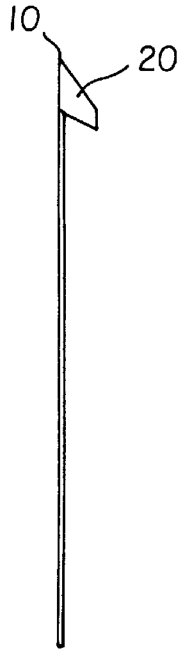
FIG. 4 is a side edge view of the cinch tabs of the present invention.
Figure 3:
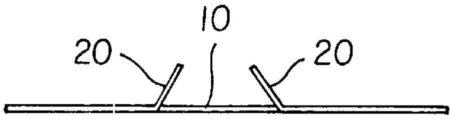
FIG. 3 is a leading edge view of the cinch tabs of the present invention.

FIGS. 2–4 are illustrations of a leader having a cinch tab of the present invention. FIG. 2 is an overhead view, FIG. 3 is a view along the leading edge and FIG. 4 is a view along a side edge. The cinch tabs 20 are formed by the leading edge 10, side edge 12 and cut 22 is the same paper notch to which has been added a pair of edge notches, as well as, a chamfer to both corners of the front edge of the backing paper leader. When creased along their respective fold lines (shown as dotted lines 24), the cinch tabs 20 extend out of the plane of the paper as shown in FIGS. 3 and 4. It is preferred that the side edges are chamfered to provide a taper to the cinch tabs 20. This facilitates insertion into the slot of the takeup spool. The cinch tabs 20 are easily folded under when the film is removed from its packaging. The cinch tabs partially refold as the leader is pushed through the slot of the take up spool with the assistance of the taper of the cinch tabs whereupon, full insertion of the leader into the slot clears the cinch tabs of the slot and allows them to reopen. Actuating the film advance mechanism of the camera turns the spool which causes the cinch tabs to grip the edge of the spool slot and forces the backing paper leader to wind onto the spool. The cinch tabs prevent the leader from slipping out of the slot preventing film advancement.

The physical dimensions of the cinch tabs are dependent upon the thickness of the backing paper and the width of the take-up spool slot. Since both could vary, the physical dimensions will be expressed as a percentage of the width of the take-up spool slot. The depth of the edge notch or cut 22 defines the height of the cinch tab when folded. Cuts ranging from 70% to 120% of the width of the spool slot were found to be acceptable with a cut of 90% to 100% being preferred. Cuts less than 70% result in cinch tabs with insufficient height to insure grip of the slot in all cases considering variations in creasing and resiliency of the backing paper. Depths above 120% were deemed excessive and could result in greater difficulty with insertion of the backing paper leader into the spool slot.

The angle the edge notch or cut makes relative to the long axis of the backing paper must be at least 90°. Angles between 90° and 125° were found to be acceptable with a preferred angle of 110° to 120°. Angles of less than 90° cause the cinch tab to ride over the slot edge and unfold, thereby releasing the leader from the spool when the spool is advanced. Angles in excess of 125° were again considered excessive and tend to reduce the ability of the cinch tab to grip the slot edge when only partially unfolded.

The chamfer introduced to the side edge of the leader provide a taper to the cinch tab height which facilitates initial insertion into the spool slot. Angles between 30° and 45° relative to the long axis of the backing paper were found to be equally acceptable and much easier to insert than without the chamfer.

Partial Perforation Approach

Figure 5:
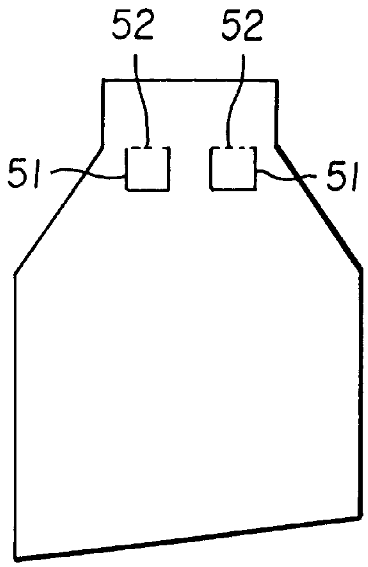
FIG. 5 is an overhead view of an alternative embodiment of the cinch tabs of the present invention.
Figure 6:
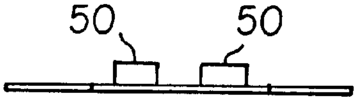
FIG. 6 is a leading edge view of an alternative embodiment of the cinch tabs of the present invention.
Figure 7:
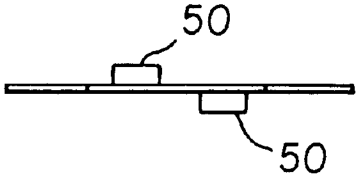
FIG. 7 is a leading edge view of an alternative embodiment of the cinch tabs of the present invention.
Figure 8:
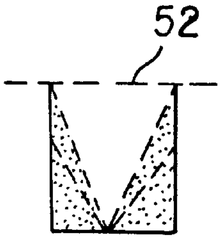
FIG. 8 is an overhead view of the cinch tab formed by the fold line and perforation of the present invention.

FIGS. 5 through 8 illustrate an alternate embodiment of the present invention. FIG. 5 is an overhead view, FIG. 6 is a view along the leading edge and FIG. 7 is a view along a side edge. FIG. 8 illustrates the preferred shape of the perforation which forms the cinch tab. FIGS. 6 and 7 depict two possible end views; cinch tabs 50 on alternate faces or on the same face. The mirror images of the cinch tab locations are equally suitable. When accomplished in a punch die operation, these partial perforations are folded out of the plane of the backing paper as illustrated in the end view of FIGS. 6 and 7 to form the cinch tabs 50. The cinch tabs are easily folded back into the plane of the backing paper when it is secured in a wound roll. Upon partial unwinding of the backing paper leader for camera loading, the cinch tabs partially unfold as a result of the normal resiliency of the polymer coated paper. They partially refold as the leader is pushed through the spool slot whereupon, full insertion of the leader into the slot clears the cinch tabs of the slot and allows them to reopen. Actuating the film advance mechanism of the camera turns the spool which causes the cinch tabs to grip the edge of the spool slot and forces the backing paper leader to wind onto the spool.

The cinch tabs are formed using a punch/die operation such that a perforation 51 is created with an edge of finite dimension that is perpendicular to the long axis of the backing paper remaining uncut. This uncut edge of the perforation 51 forms the fold line 52 (dotted line) of the cinch tab and shall be towards the front edge of the backing paper leader. The shape of the partial perforation as illustrated in FIG. 8 can be any form such that the cut line of the partial perforation passes within the shaded area bounded by the limits of a triangle and a rectangle Since these cinch tabs could be employed in a variety of backing paper applications involving different spool slots, their physical dimensions will be expressed as a percentage of component dimensions. For the width of the cinch tabs, the minimum width of the backing paper leader will be the dimensional basis. For the cinch tab height, the take-up spool slot width will be the basis. Widths of the cinch tabs between 8% and 20% of the width of the backing paper leader were found to be suitable when placed within the area bounded by the three support ribs in the take-up spool. Cinch tabs of width of 16% are preferred. Cinch tabs less than 8% are of insufficient integrity to accomplish their objective while cinch tabs in excess of 20% offer no benefit and may be interfered with by the support ribs of the take-up spool.

Height of the cinch tabs (FIGS. 6 and 7) between 80% and 150% of the take-up spool slot width were found satisfactory with a height between 100% and 120% preferred. Cinch tabs with a height of less than 80% are insufficient to insure grip of the spool slot edge while a height in excess of 150% was unnecessary.

The cinch tabs may be produced by partial perforation from either the front or backside of the backing paper and may be punched from the same side or opposite sides as shown in FIGS. 6 and 7. Based on a limited number of test specimens it was found that preparing the pair of cinch tabs from opposite sides such that one protrudes from the front and one from the back resulted in the best grip to the spool slot edge and is therefore preferable. A single centrally located cinch tab will also achieve cinching if its dimensions tend toward the larger dimensions discussed above.

The present invention utilizes the existing preferred polymer coated paper medium for backing paper and requires no modification to existing take-up spools or camera hardware. The present invention eliminates the need for customer skill and coordination to achieve cinching during loading of roll film. Additionally the present invention allows for the use of thinner, less expensive paper stock with limited stiffness as the backing paper substrate. The present invention approach will work using either the current slotted take-up spool or the take-up spool with a cinch post described in EP 0763768 A2. The need to sort spool styles is eliminated and the removal of backing paper from spools is made easier by the present invention.

The invention has been described in detail with particular reference to certain preferred embodiments thereof, but it will be understood that variations and modifications can be effected within the spirit and scope of the invention.

What is claimed is:

1. A photographic roll film comprising:

a photographic film strip;

a light shielding paper secured to said photographic film strip having a leader comprising;

a front edge, and two side edges at least one cinch tab extending out of a plane of the light shielding paper formed by the front edge, a side edge and a cut forming a cut angle of greater than 90° with a long axis of the leader.

2. The photographic roll film of claim 1 wherein the cut angle greater than 90° and less than 125°.

3. The photographic roll film of claim 1 wherein the cut angle is between 110° and 120°.

4. The photographic roll film of claim 1 where the side edges form a chamfer angle relative to the long axis of the leader of between 30° and 45°.

5. A photographic roll film comprising:

a photographic film strip;

a light shielding paper secured to said photographic film strip having a leader having a front edge comprising;

at least one cinch tab extending out of a plane of the light shielding paper formed by a perforation and a fold line, the fold line closer to the front edge of the leader than the perforation.

6. The photographic roll film of claim 5 wherein the cinch tab comprises a triangular shape.

7. The photographic roll film of claim 5 wherein the cinch tab comprises a rectangular shape.

8. The photographic roll film of claim 5 wherein the fold line is perpendicular with a web direction of the film strip.

9. A photographic roll film comprising:

a photographic film strip;

a light shielding paper secured to said photographic film strip having a leader comprising;

at least one cinch tab extending out of a plane of the light shielding paper.

* * * * *